Dec. 20, 1960 — G. A. BERGFORS — 2,964,973
PEDAL AND FOOT STRAP THEREFOR
Filed Dec. 12, 1958 — 2 Sheets-Sheet 1
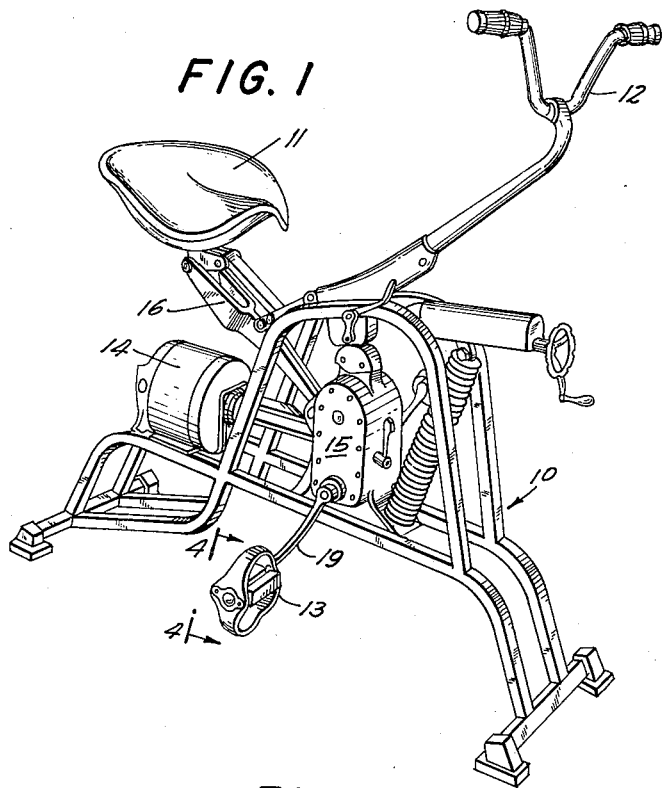
FIG. 1
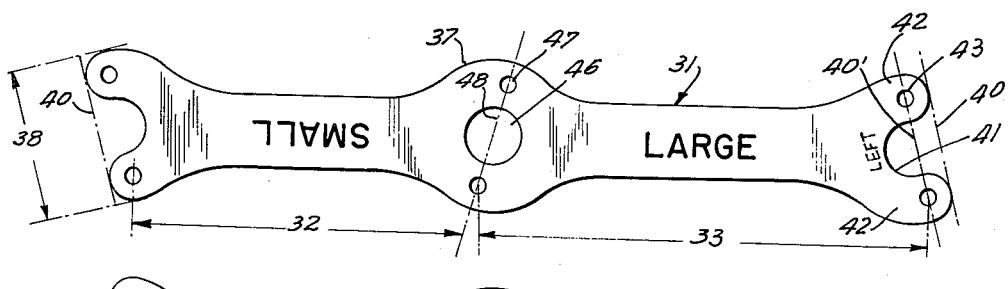
FIG. 2
FIG. 3
INVENTOR.
GORDON BERGFORS
BY
Dean, Fairbank & Hirsch
ATTORNEYS Dec. 20, 1960  G. A. BERGFORS  2,964,973
PEDAL AND FOOT STRAP THEREFOR
Filed Dec. 12, 1958  2 Sheets-Sheet 2
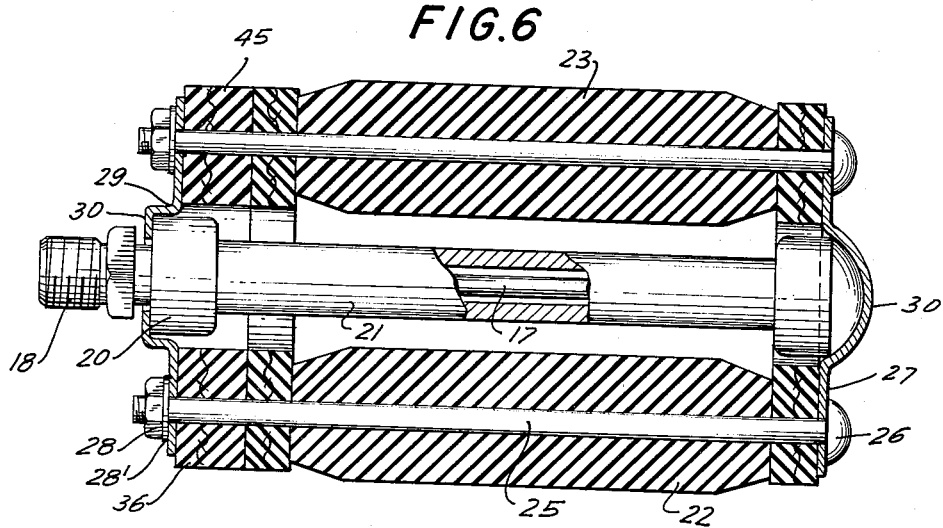
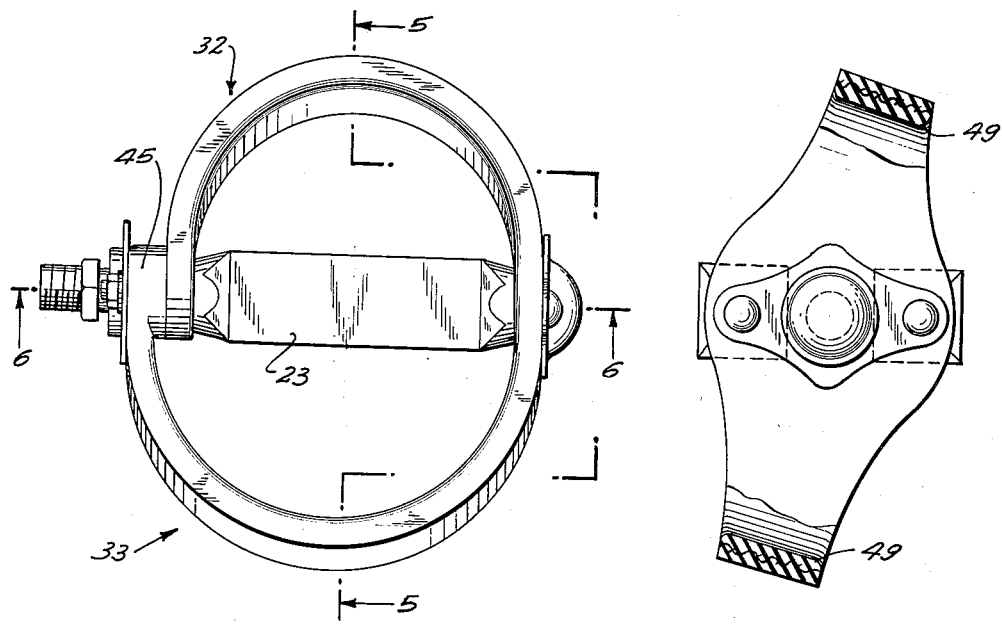
INVENTOR
GORDON BERGFORS
BY
Dean, Fairbank & Hirsch
ATTORNEYS

United States Patent Office 2,964,973
Patented Dec. 20, 1960

2,964,973

PEDAL AND FOOT STRAP THEREFOR

Gordon A. Bergfors, New York, N.Y., assignor to Exercycle Corporation, a corporation of New York Filed Dec. 12, 1958, Ser. No. 780,085

5 Claims. (Cl. 74—594.6)

The present invention is concerned particularly with pedals of the general type used on bicycles, but more especially to such as are constructed for utility with the motor-driven pedals of exercising machines.

As conducive to a clear understanding of the invention, it is noted that motor-driven exercising machines of the type in which a motor drives the pedals, are subject to objections if used with the ordinary bicycle pedal, since the foot strap of such ordinary bicycle pedals need not accommodate the foot with precision, the pedal being driven by the user's foot and thus the strap of such pedal will adequately accommodate that foot without serious likelihood of injury. With an exercising machine of the type in which the pedals are mechanically driven and move the foot and legs of the user whose feet rest passively on the pedals, the ordinary bicycle foot strap, if loose about the instep of a small foot, is likely forcefully to strike the instep, with danger of bruising or even cutting the instep by the edge of the strap; and where a larger foot fits more or less tightly into the strap, there is considerable likelihood of abrasion at one edge of the foot strap with possible bruises or even cuts. Bearing in mind that exercising machines, whether used in the home or in the gymnasium, must be adapted for use by persons of various foot sizes, the difficulty cannot be obviated by a custom-built strap to suit a particular individual, even assuming that the cost of such custom-built strap were not prohibitive. Moreover, it would not be practical, feasible or economical to provide a multiplicity of interchangeable foot straps of various sizes to fit various members of the family or other group.

It is accordingly one of the objects of the invention to provide a foot strap for an exercising machine of the motor-driven pedal type in which a unitary foot strap element may be assembled to the substantially conventional bicycle pedal, which will admit of ready introduction of the foot and afford accommodation with thorough comfort for the foot of a large man or of a small woman or child and in which the pedal at rest extends horizontally in the absence of the special counterweight that serves the latter purpose in the case of conventional bicycle pedals.

In the accommodation drawings in which are shown one or more of various possible embodiments of the several features of the invention:

Fig. 1 is a perspective view showing one type of motor-driven exercising machine to which the invention is applicable.

Fig. 2 is a plan view of a preferred embodiment of foot strap band for the left pedal.

Fig. 3 is a similar view of such band for the right pedal.

Fig. 4 is an end elevation taken on line 3—3 of Fig. 1 showing the pedal with the foot strap band installed thereon.

Fig. 5 is a sectional view taken on line 5—5 of Fig. 4, and

Fig. 6 is a transverse sectional view taken on line 6—6 of Fig. 5.

Referring now to the drawings, there is shown in Fig. 1 a familiar construction of motor operated exercising machine for use in which the invention has been particularly developed, but it will be understood that the invention is applicable to the pedals of other types of motor-driven exercising machines and is advantageous also for ordinary bicycles.

In the perspective view of Fig. 1, the exercising machine comprises a frame 10, a seat 11, a handlebar 12, and a pair of pedals, one of which is shown at 13. The pedals are driven from an electric motor 14, which is mounted on frame 10 and transmits power through a reduction gear box 15. The machine may also include linkage 16, for moving the seat and the handlebar in timed relation with the pedals 13 by power from motor 14.

The structure (other than the foot strap) of the pedal best shown in Fig. 6, may be substantially identical with that of the conventional bicycle pedal. It may comprise, as best shown in Fig. 6, a mounting and driving rod 17, having a protruding stud 18, which is screwed to the pedal crank 19 of the machine illustratively shown in Fig. 1. The rod 17 has bearings (not shown) in the enlarged ends 20 of a housing tube 21 for said rod. This conventional bicycle pedal also may include a pair of prismatic vulcanite foot rest blocks 22 and 23, at opposite sides of the mounting rod 17 and parallel thereto, through each of which extends a bolt 25, with its head 26 against a cap plate 27 at one end of the pedal and lock-nuts 28 at the other end of each of said rods pressing against cap plate 29, said cap plates being centrally domed at 30 to accommodate the enlarged ends 20 of the housing tube 21 for the central or mounting rod 17.

The foot strap structure insofar as it appears on Fig. 5, and not thus far described, will be apparent from the description which follows.

In a preferred embodiment of the invention, the foot strap is a unitary band 31, best shown in Figs. 2 and 3, which may afford in association with the otherwise conventional bicycle pedal as above described, duplex foot straps as best shown in Fig. 4, including a smaller foot strap segment 32 and a larger strap segment 33. The larger segment 33 serves for accommodating a man's foot of larger size and the smaller segment 32 for a woman's or child's foot of smaller size. These segments as shown, straddle opposite faces of the pedal structure.

Referring now to Fig. 2, the duplex foot strap band 31 is fabricated desirably of the rubber conventionally used for bicycle straps, vulcanized to and through the opposite faces of an intervening woven fabric breaker strip 36. The strap may be of a width of about 1½ inches for the major portion of its length and of thickness of about ¼ inch. The band is widened at 37 along a symmetrically outwardly curved conformation at the mid-region of its length near, but spaced from the exact middle of the band 31. The opposite ends of the band 31 which may be of a length of about 16 inches are also widened at 38 and their extremities extend in parallel relation, not at right angles to the length of the band, but at an oblique angle thereto, indicated by lines 40 which may be an angle of 75 degrees to the length of the band. Each end of the band is bifurcated as shown by a generally circular cut-out 41, thereby affording two fingers 42 at each end of the band. Each finger has near its center a small circular aperture 43 therethrough. The apertures 43 near each end of the strap extend along lines at an oblique angle 40' to the length of the strap, parallel to line 40. Near the ends of the longer segment 33 of the strap marked "Large," each finger 42 has integral therewith a thickening pad conformation 45 at its inner face about the corresponding aperture 43.

The enlarged mid-portion 37 has a central aperture 46 of a diameter to accommodate the enlarged end 20 of housing tube 21 and of the same diameter as the cut-outs 41 at the ends of the band. The enlarged midsection of the strap also has a pair of small apertures 47 therethrough at opposite sides thereof, the connecting line 48 therebetween being at the same inclination to the length of the band 31 as are the lines 40' connecting the small apertures 43 near the opposite ends of said band. However, the inclination of the connecting line 48 between the apertures 47 in the enlargement 37 near the mid portion of the band 31 is opposed to the inclination of the connecting lines 40' of the apertures 43 near the respective ends of the strap.

The strap is rounded off at the inner face thereof as at 49, along both longitudinal edges thereof.

The outer face of the strap may have desirably molded therein the word "Large" as shown in Figs. 2 and 3 for the longer segment 33 that serves as the strap for larger users and has similarly molded therein the word "Small" for the shorter segment 32 that serves for smaller users.

The unitary band 31 affording the foot strap above described, is installed on the otherwise generally conventional bicycle pedal as best indicated in Figs. 4, 5 and 6. The bolts 25 through the foot rest blocks 22 pass through corresponding apertures in the cap plate 27 of the pedal (which plate their heads 26 engage as previously stated), and through the small apertures 47 near the mid section 37 of the foot strap band 31. At the opposite end, the bolts 25 pass through the respective apertures 43 near one end of the foot strap band 31 and also through the apertures 43 near the opposite end of the foot strap band, the thickened pad portion 45 of which is superposed in direct contact with the other end of the band. The metal cap plate 29 superposed over the overlapped end portions of the band 31 is firmly held thereagainst in the assembly. To this end, pressure is applied in a suitable jig along the length of the bolts 25, the ends of said bolts protruding through the cap plate 29 and the nuts 28 with their lock washers 28' are tightened against the cap plate 29 to complete the assembly.

In the assembled construction it will be seen that the greater length of the larger foot strap segment 33 is accommodated by the thickened pads 45 which are an integral part of said larger segment of the duplex foot strap band 31.

The right pedal is shown in the figures but of course the left pedal would be applied and installed in exactly the same way.

When the pedal is installed on the machine, as indicated in Fig. 1, it will be seen that the greater weight of the longer segment 33, compared to that of the shorter segment 32 serves as a counterweight to keep the pedal normally in position with the larger foot strap downward and the smaller foot strap upward. This occurs inherently without the need for the conventional counterweight for the strap of ordinary bicycle pedals.

In use of the machine by a woman or child, the foot would readily be passed through the smaller foot strap since this is inherently in correct position. For use by a man, he would simply turn the pedal by gently pushing it with his foot to bring the larger foot strap 33 upward prior to passing his foot between the pedal body and its strap.

By reason of the inclined relation of connecting lines 40' and 48 between the mounting apertures 43 and 47 of the strap segments, it is seen that each of the straps is inclined, as best shown in Fig. 5 across its width, in idle position of the pedal with its foot rest blocks 22 horizontal. Accordingly, the foot may readily enter, as suggested in dot and dash lines in Fig. 5.

In operation of the machine, the motor-driven pedals press upward against the sole of the user's foot, which is kept in engagement with the pedal blocks 22 and in no event will there be any annoying pressure of the foot strap against the instep, which fits comfortably under the strap regardless of wide variations in the thickness of feet from user to user.

It will thus be seen that the present invention affords a particularly simple and thoroughly effective foot strap construction especially suitable for an exercising machine having motor-driven pedals, which affords ready accommodation for the small foot of a woman or child and the larger foot of a man. Accordingly, an exercising machine equipped with the pedal, but embodying the duplex foot strap set forth, requires no change in its construction for adaptation to various members of a family or group.

While the invention finds its preferred applicability in the particular relation shown and described, it will be understood that the invention is not limited to such application.

The principle of the invention could be applied in its broader aspects to a single, rather than a duplex foot strap, in which would inhere the advantages set forth, of the inclined width of the strap following from the inclined relation of the line connecting the mounting holes for the ends of the foot strap. Where the single foot strap is used, the function of the conventional counterweight is absent, and such counterweight would be used in such application.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pedal of the type described, comprising a foot rest and a foot strap constituting a flexible band member consisting of a longer segment and a shorter segment unitary therewith, means affixing said band member near its middle to one end of the foot rest and means affixing the extremities of said band in superposed relation to the other end of the foot rest, the longer band segment being thickened at one face near its free extremity, said thickened portion engaging the extremity of the shorter segment in the assembly, thereby forming a foot strap of smaller size at one side of the foot rest and a foot strap of larger size at the opposite side of the foot rest.

2. A pedal suitable as the motor-driven pedal of an exercising machine, said pedal being of the type having a pair of parallel foot rest blocks extending the width thereof, cap plates at opposite ends thereof, bolts affixed by said cap plates and extending through the length of the foot rest blocks, said pedal also having a mounting bolt between and parallel to said first bolts and retained in place by said cap plates, a flexible band member consisting of a longer segment and a shorter segment unitary therewith, affixed near its middle by one of the cap plates and at its superposed ends by the other cap plate between the corresponding ends of the foot rest blocks, said strap element having a median cut-out for accommodating one end of said mounting bolt and median cut-outs at its ends in superposed relation for accommodating the other end of the mounting bolt, said foot strap element having a small lateral apertures near its ends for accommodating those bolts that extend through the foot rest blocks, said small apertures near each end being along a line inclined at an acute angle to the length of the strap, said lines at opposite ends of the foot strap element being inclined in the same direction with respect to the length of the strap, whereby the width of the foot strap in installated position will be inclined with respect to the upper face of the foot rest blocks.

3. A unitary band to serve as a duplex foot strap suitable for motor-driven pedals of an exercising machine, said band being flexible and substantially nonelastic, having its ends substantially parallel and inclined at an acute angle to the longitudinal axis of the band, said extremities having large median cut-outs defining a pair of lateral end fingers, each of said fingers having a small aperture therethrough, the apertures at the respective ends being on lines parallel to each other and at an acute angle to the axis of the band, the band having a widened portion somewhat near one end than the other end thereof, defining a longer strap segment near one extremity and a shorter strap segment near the other extremity thereof, the widened portion of the band having a central aperture and a pair of small apertures laterally thereof, the connecting line therebetween being at an angle to the longitudinal axis of the band substantially equal to that of the line connecting the small apertures at each end thereof, but extending in direction opposite the inclination of the connecting lines between the two apertures near the ends of the strap, the apertures near the end of the larger band segment having thickened portions thereabout at the inner face thereof.

4. The strap as claimed in claim 3 in which the outer face is identified by markings indicating respectively the shorter and the longer segment and a further marking indicating the right or left pedal as the case may be.

5. The combination recited in claim 3 in which the bands for the left and the right pedals, respectively, are identical in size and shape with identifying imprints for the left pedal on the face opposed to that for the right pedal.

References Cited in the file of this patent

UNITED STATES PATENTS

| | | |
|---|---|---|
| 85,375 | Fontayne | Dec. 29, 1868 |
| 597,780 | Morris | Jan. 25, 1898 |
| 597,830 | Herrick | Jan. 25, 1898 |
| 600,251 | D'Albert | Mar. 8, 1898 |
| 622,032 | Baker | Mar. 28, 1899 |
| 1,417,447 | Brown | May 23, 1922 |
| 2,406,344 | Bergfors | Aug. 27, 1946 |